United States Patent [19]
Cockett et al.

[11] Patent Number: 5,360,547
[45] Date of Patent: Nov. 1, 1994

[54] SORBING AGENTS

[75] Inventors: Keith R. Cockett, Cheshire; Martin Concannon, West Kirby; Robert M. Hunter, Cheshire, all of United Kingdom; Anthony L. Lovell, Clwyd, Wales; Anthony Nock; Maurice Webb, both of Cheshire, United Kingdom; Roderick T. Whalley, Merseyside, United Kingdom

[73] Assignee: Unilever Patent Holdings B.V., Vlaardingen, Netherlands

[21] Appl. No.: 38,939

[22] Filed: Mar. 29, 1993

[30] Foreign Application Priority Data

Mar. 28, 1992 [GB] United Kingdom ............... 9206841

[51] Int. Cl.$^5$ ............................................. C02F 1/28
[52] U.S. Cl. ................................. 210/690; 210/691; 210/502.1
[58] Field of Search ............... 210/690, 663, 502.1, 210/691, 660; 502/414, 415; 423/25, 29

[56] References Cited

U.S. PATENT DOCUMENTS

| | | | |
|---|---|---|---|
| 4,019,982 | 4/1977 | Ikari et al. | 210/47 |
| 4,264,373 | 4/1981 | Shinbori et al. | 210/670 |
| 4,458,030 | 7/1984 | Manabe et al. | 502/183 |
| 4,642,193 | 2/1987 | Miyata et al. | 210/682 |
| 4,744,825 | 5/1988 | Chen et al. | 210/686 |
| 4,752,397 | 6/1988 | Sood | 210/662 |
| 4,867,882 | 9/1989 | O'Neill et al. | 210/684 |
| 4,935,146 | 6/1990 | O'Neill et al. | 210/684 |
| 5,051,189 | 9/1991 | Farrah | 210/679 |
| 5,055,199 | 10/1991 | O'Neill et al. | 210/684 |
| 5,179,063 | 1/1993 | Harris et al. | 502/414 |
| 5,256,300 | 10/1993 | Cockett et al. | 210/691 |

FOREIGN PATENT DOCUMENTS

| | | |
|---|---|---|
| 56-98265 | 7/1981 | Japan . |
| 222159 | 9/1924 | United Kingdom . |
| WO91/19850 | 12/1991 | WIPO . |

Primary Examiner—Cynthia L. Nessler
Attorney, Agent, or Firm—Cushman, Darby & Cushman

[57] ABSTRACT

A method of treating a liquid medium to remove from it matter present therein comprises adding to the liquid medium at least one of an at least partially undried sorbing agent (a), a freshly prepared sorbing agent (b) and an in-situ sorbing agent (c). Sorbing agent (a) comprises a hydrotalcite-like material resulting from the preparation thereof in a liquid reaction medium, which preparation allows retention, in the hydrotalcite-like material, of at least 10% of free liquid, based on the weight of the hydrotalcite-like material, including the free liquid, and $(a)_1$ which sorbing agent is present in an amount, on a dry weight basis, of the sorbing agent, by volume of the liquid medium to be treated, of $\leq 0.035\%$ w/v, or $(a)_2$ the preparation of the hydrotalcite-like material is such as to provide a grain size of the hydrotalcite-like material of $\leq 130$ Å, as measured in the <001> direction by x-ray diffraction on a subsequently dried material. Sorbing agent (b) comprises a hydrotalcite-like material resulting from the preparation thereof in a liquid reaction medium and present in the reaction medium without substantial removal of the reaction medium. Sorbing agent (c) comprises a reaction mixture capable of forming, in-situ, in the contaminated liquid medium, a hydrotalcite-like material.

32 Claims, 2 Drawing Sheets

SORBING AGENTS

This invention relates to sorbing agents for removal of matter from a liquid medium especially unwanted material from a contaminated liquid medium, such as potable water or influent or effluent water from an industrial plant, for example, in the textile, paper, leather and food and drink, for example, brewing, industries.

It has been disclosed that certain anionic clay materials, especially hydrotalcite, find use as ion exchangers and adsorbers, especially for removal of slurry metals; see W. T. Reichle, Chemtech (January 1986), page 58.

Hydrotalcite-like materials, including hydrotalcite, pyroaurite and stichtite are disclosed in U.S. Pat. No. 4,458,030, U.S. Pat. No. 4,019,982, GB-A-1336863, GB-A-1336864, GB-A-1336865 and GB-A-1336866. U.S. Pat. No. 4,458,030 discloses the use of a mixture of hydrotalcite and activated carbon as a multipurpose absorbent, while U.S. Pat. No. 4,019,982 teaches the use of a hydrotalcite-like material for removing organic pollutants from waste water such as pulping waste water, water containing natural humic substances, dyeing waste water, etc.

Conventionally hydrotalcites are prepared by adding to an alkaline solution a solution or solutions containing aluminium and magnesium ions, whereupon a precipitate is formed, which is then aged by heating the resulting slurry for about two hours to form a hydrotalcite structure having a grain size of about 200 Å. The slurry is then pressed to form a filter cake, which is washed with demineralized water, then completely dried, usually by a series of drying steps and then milled to form a powder, which is used as the adsorbent.

U.S. Pat. No. 4,019,982 describes the preparation of a hydrotalcite-like material by admixing simultaneously magnesium chloride, sodium aluminate and a mixture of sodium hydroxide and sodium carbonate. This produces a gel-like precipitate which is aged, washed, dried and pulverized to obtain a powdered adsorbent.

EP-A-0431867 describes the incorporation of hydrotalcite-like materials in detergent compositions for prevention of "cross-staining" by dyestuffs during a washing operation; as shown, the hydrotalcite-like materials are capable of rapidly sorbing dyestuff which has passed from one fabric being washed into the washing water so as to prevent the dyestuff from staining any other fabric. The hydrotalcite-like materials described include an undried sample prepared (as a convenient method of achieving a particular desired particle size) by filtering the hydrotalcite-like material, washing it and resuspending it in water to give a 10% solids slurry. The preparation of this sample incudes an ageing step which will increase considerably its grain size as measured by x-ray diffraction (XRD) in the <001> direction to a value of about 250 Å. The preparation of the same undried sample is also described in WO-A-91/19850, which discloses a method of removing unbound dye from a coloured substrate in a washing bath by contacting the wash bath medium with various hydrotalcite-like materials. No tests were made on the undried sample.

EP-A-0431867 also describes various dried samples of hydrotalcite-like material. Although not mentioned specifically, those measured by a method 3 described therein and for which sorption kinetics data are given will have a grain size, as measured above, <110 Å. This document also gives sorption kinetics data for particles of various sizes prepared by respective procedures designed to provide such variations in particle size, namely micronization (6 $\mu$m), filtering, washing and suspending to form a slurry (i.e. undried particles), as described above (13 $\mu$m), and spray drying (29 $\mu$m). There is an indication that particles of smaller size may be more effective but no indication of any benefit to be lost or gained by a drying step.

WO-A-92/09529 was published after the priority date of this application and describes the preparation of dried hydrotalcite-like materials having a grain size <110 Å as described above. They are shown to have a greater rate of sorption than (improved sorption kinetics as compared with) corresponding aged materials which are of larger grain size (250 Å).

We have now tested the sorption characteristics of various hydrotalcite-like materials using tests of somewhat greater sensitivity than those adopted in EP-A-0431867 and WO-A-92/09529 supra; although the test described in these documents is eminently suitable for illustrating the excellent sorption kinetics and consequent reduction in cross-staining achieved with hydrotalcite-like materials when used in practical washing and dye wash off conditions (relatively high sorbant concentrations and long washing times), the more sensitive tests which we have now adopted (described in more detail below) and which, in particular provide sorption kinetic and capacity data at much lower concentrations of hydrotalcite-like material, enables the performance of the hydrotalcite-like materials at such lower concentrations to be evaluated more fully. Especially for uses where the capacity of the hydrotalcite-like material is of prime importance, for example in the treatment of waste water, assessment which will allow determination of the minimum concentration of sorbent material necessary for treatment is of considerable economical importance.

Our further investigations have revealed, surprisingly, that, firstly, especially at a low concentration of hydrotalcite-like material, at a concentration, on a dry weight basis, of $\leq 0.35$ g/l, preferably $\leq 0.2$ g/l, more preferably $\leq 0.15$ g/l, for example 0.12 g/l or less, especially $\leq 0.1$ g/l, for example 0.07 g/l or less, or so low that less than three times and preferably less than twice, the nominal saturation limit for a given sorbate is present in the liquid medium to be treated, then unexpectedly fast sorption kinetics may be achieved even at such high levels of sorbate by weight of sorbent if the hydrotalcite-like material is a material which, during its manufacture, has been allowed to remain at least partially undried.

On the other hand a powdered hydrotalcite-like material which, during its manufacture, has been fully dried, in accordance with the conventional practice, behaves in the expected manner that, as sorbate concentrations relative to the weight of sorbent approached saturation, so the rate of sorption is considerably reduced.

Thus, unexpectedly, we find that, especially at low concentrations of hydrotalcite-like material, an at least partially undried hydrotalcite-like material is capable of sorbing a sorbate at a much higher rate than the corresponding fully dried material.

This enables excellent sorption characteristics (both in terms of kinetics and capacity) to be achieved using no or little more than a minimum amount necessary to attain a nominal saturation level, i.e. the level achieved under the practical sorption conditions experienced.

This ability to achieve practically the same sorption effects using considerably smaller amounts of materials than have been used conventionally is highly attractive commercially.

Secondly, we find surprisingly that although for particles of a hydrotalcite-like material having a grain size >130 Å the extent to which the particles are dried does not appear to have a significant effect upon the equilibrium uptake of a particular sorbate (sorption capacity of the hydrotalcite-like material), this is not the case for particles of a material having a grain size $\leq 130$ Å; for such particles a considerable improvement in the overall sorption capacity can be achieved by preparing a hydrotalcite-like material, such as hydrotalcite, in a liquid reaction medium in a manner such as to provide a grain size of $\leq 130$ Å, measured as described above and allowing the material to remain at least partially undried so as to retain at least 10% free liquid, based on the total weight of hydrotalcite-like material, including the free liquid (by "free liquid" we mean liquid which would be lost on drying at 110° C., as opposed to structurally bound water, for example, water of crystallization and hydroxyl groups). Preferably the material includes at least about 15% of free liquid.

Indeed it is especially surprising that, as described later in more detail, a dramatic improvement in sorption properties may occur for a free liquid content remaining at a level of at least 15% as compared with a product which has been dried to a free liquid content less than 15%.

Moreover, further improvements in sorption performance may be achieved as the free liquid content allowed to remain in the product is increased. Thus, even better results are obtained if a slurry of hydrotalcite-like material obtained directly from the reaction mixture is employed.

Thirdly, we also find surprisingly that, for any hydrotalcite-like material, the shorter the time between formation of the slurry and its use as a sorbing agent, the more efficient the sorption may become, this being especially so if the material is retained in the reaction medium and used in this form without significant removal of the reaction medium.

Fourthly, we find, even more surprisingly, that excellent sorption characteristics may be obtained using, as a sorbing agent, a mixture of reaction components capable of forming, in-situ, in the liquid medium from which matter is to be removed, a hydrotalcite-like material.

In a preferred method, the hydrotalcite-like material of the at least partially undried sorbing agent (a) or of the freshly prepared sorbing agent (b) or the hydrotalcite-like material formed in-situ by the reaction mixture of sorbing agent (c), has a grain size $\leq 110$ Å as measured in the <001> direction by x-ray diffraction on a subsequently dried material.

According to one aspect, the present invention provides a method of treating a liquid medium, such as a contaminated liquid medium, to remove from it matter present therein, such as unwanted material, which method comprises adding to the liquid medium at least one of an at least partially undried sorbing agent (a), a freshly prepared sorbing agent (b) and an in-situ sorbing agent (c), which sorbing agent (a) comprises a hydrotalcite-like material resulting from the preparation thereof in a liquid reaction medium, which preparation allows retention, in the hydrotalcite-like material, of at least 10%, preferably at least 15%, of free liquid, based on the weight of the hydrotalcite-like material, including the free liquid, and (a)$_1$ which sorbing agent is present in an amount, on a dry weight basis, of the sorbing agent, by volume of the liquid medium to be treated, of $\leq 0.035\%$ w/v, or (a)$_2$ the preparation of the hydrotalcite-like material is such as to provide a grain size of the hydrotalcite-like material of $\leq 130$ Å, as measured in the <001> direction by x-ray diffraction on a subsequently dried material;

which sorbing agent (b) comprises a hydrotalcite-like material resulting from the preparation thereof in a liquid reaction medium and present in the reaction medium without substantial removal of the reaction medium; and which sorbing agent (c) comprises a reaction mixture capable of forming, in-situ, in the liquid medium, a hydrotalcite-like material.

In order to measure the grain size of the material, it is, most conveniently, firstly dried, for example, in an oven at 100–120° C., but in any event in a manner which will avoid ageing of the material.

The invention also provides the use of such a sorbing agent (a) and/or (b) and/or (c) for removal of matter from a liquid medium.

The method and use of the invention are applicable, for example, to the treatment of potable water, or influent and effluent water in industrial plants, especially those of the textile, paper, leather and food and drink industries.

For example it will allow removal of dyestuff materials from waste water, as well as humic materials from both influent and effluent water.

In particular, the following liquid media can be treated by methods embodying the invention.

Effluents i) Dyestuffs/colorants: mainly in the textile industry but also printing inks, paper industry, leather industry etc.

ii) Mothproofing agents applied to woollen carpet yarn to protect finished carpets.

iii) Pesticides in raw wool scouring liquors; sheep dip pesticides are washed out of wool during scouring and are discharged to sewers and ultimately rivers.

iv) Absorbable organo halogens (AOX); products of chlorination of wool to produce machine washable wool and also found if cotton or wood pulp is bleached with hypochlorite.

v) Removal of above as "end-of-pipe" treatment or via small treatment units fitted to the side of machines to minimise dilution effects.

Influents/Potable Water

Influent: Removal of humic substances for textile and papermaking processes and in the food and drink industry but also pre-treatment of water for ultrafiltration or reverse osmosis in the pharmaceutical and electronics industries.

Potable Water:

Removal of humic substances.
ii) Removal of pesticides/herbicides.
iii) Removal of phosphate and/or nitrate.

Methods embodying the invention can also find use in allowing sorption of desired materials from liquid media containing them.

For example, the method may be used to prepare a dosage form of a material such as a dyestuff.

Thus a solution of dyestuff, preferably a concentrated solution is treated with the at least partially undried hydrotalcite-like material, with the freshly prepared hydrotalcite-like material or with a mixture of reaction products capable of forming, in the solution, the hydrotalcite-like material and thereafter the hydrotalcite-like material is removed from the solution. The hydrotalcite-like material may then have, sorbed on it, a significantly higher concentration of dye than would be obtained by sorption of dye onto a dry product, as exemplified in WO-A-91/19850. The resultant product may then be especially useful as a pigment or as a dosage form for adding a controlled quantity of dyestuff.

According to another aspect the invention provides such a dosage form of a desired product for example a dyestuff or an organotoxin, especially a pesticide such as a mothproofing agent, which dosage form comprises a sorbing agent and sorbed onto the sorbing agent, the product, the sorbing agent comprising at least one of an at least partially undried sorbing agent (a), a freshly prepared sorbing agent (b) and an in-situ sorbing agent (c), which sorbing agent (a) comprises a hydrotalcite-like material resulting from the preparation thereof in a liquid reaction medium, which preparation allows retention, in the hydrotalcite-like material, of at least 10%, preferably at least about 15%, free liquid, based on the weight of the hydrotalcite-like material, including the free liquid, and (a)$_1$ which sorbing agent is present in an amount, on a dry weight basis, of the sorbing agent, by volume of the liquid medium to be treated, of $\leq 0.035\%$ w/v, or (a)$_2$ the preparation of the hydrotalcite-like material is such as to provide a grain size of the hydrotalcite-like material of $\leq 130$ Å, as measured in the $<001>$ direction by x-ray diffraction on a subsequently dried material;

which sorbing agent (b) comprises a hydrotalcite-like material resulting from the preparation thereof in a liquid reaction medium and present in the reaction medium without substantial removal of the reaction medium; and which sorbing agent (c) comprises a reaction mixture capable of forming, in-situ, in the presence of the product, a hydrotalcite-like material.

Preferably, when preparing a dosage form of a product such as a dyestuff, the product is present in an aqueous medium, preferably in solution, the hydrotalcite-like material, or reaction components forming it in-situ, being merely added to the aqueous medium.

However, when preparing a dosage form of certain desired products, the product may preferably be in a solvent, especially an organic polar solvent, or a mixture thereof with water.

A typical product which can be formulated into a dosage form using a mixture of an organic solvent with water is a mothproofing agent, eg permethrin.

In such a case, the hydrotalcite-like material, or reaction components forming it in-situ, may also contain, or be present in, an organic solvent.

When a powder of the hydrotalcite-like material is employed as a sorbing agent in accordance with the invention, it is essential that this should have been allowed to remain at least partially undried during its preparation so as to retain at least 10% free liquid.

When, as is preferred, the free liquid is an aqueous medium, it is found surprisingly that when the free liquid allowed to remain in the hydrotalcite-like material approaches about 14–16%, a dramatic increase in sorption efficiency occurs.

Examples of progressively drier forms of the hydrotalcite-like material are (i) a slurry formed by precipitation of the hydrotalcite-like material from the reaction medium and containing, say, 2–10%, for example, 4–8%, especially 6–8% solids, (ii) a slurry formed by filtering the precipitate and reslurrying to a desired concentration of hydrotalcite-like material, (iii) a still wet mass formed by liquid/solid separation such as a filter cake formed, for example, by a filter press (with or without subsequent) washing, which is then milled without further dewatering, (iv) a mass produced by the steps of (1) part drying the mass (iii), for example, by air drying, of a mass such as a filter cake to increase the solids content to an extent suitable for further processing (for example a solids content of 40–45% may facilitate a subsequent milling step) but not to an extent which would promote aggregation of the particles or otherwise limit the capacity of the hydrotalcite-like material to absorb contaminant material from the medium to be treated, and thereafter (2) milling; and (v) a mass (iv) which is further dried before milling, say to 10–20% especially 15–20% free liquid.

All of the above materials (i)–(v) may be reslurried in an aqueous medium, and/or other additives included, depending on their intended use.

The product may take the form of a gel, i.e. a product in which the solid phase is entirely homogeneous.

When a slurry (i) formed directly by precipitation from a reaction medium is employed as a sorbing agent, then for a shorter delay between formation of the slurry and its use as a sorbing agent, the sorption efficiency may be increased still further.

When the hydrotalcite-like material is added to the liquid medium in the form of a slurry, either as immediately formed by the reaction, or when reslurried for addition to the liquid medium, the solids content of the hydrotalcite-like material in the slurry may be from 1 to 20%, typically 5 to 10%, by weight of the total slurry, depending upon the particular needs of application.

The sorption efficiency of the hydrotalcite-like material may be further improved, even as compared with any of the partially dried or completely undried solid forms referred to above, by preparing the hydrotalcite-like material in-situ in the presence of the material to be sorbed. Such a method is especially useful for removal of dyestuffs and organotoxins.

In this case, all of the reaction components may be present in solution, preferably aqueous solution.

However, we have found, especially surprisingly, that even better results may be achieved if at least one of the reaction components was added to the medium containing the material to be absorbed, in solid form.

The reaction components may be admixed prior to their addition to the liquid medium to be treated but in this case, it is preferable to admix the reaction components immediately before addition, for example, by immediately tipping the reaction mixture into the liquid medium or, more preferably, directing solutions of the respective reaction components (i) through respective conduits which unite with one another to form a single conduit, such as a Y-piece or a T-piece, and then (ii) through the single conduit to the liquid medium to be treated. The length of the single conduit may range from several centimeters to several tens of metres to provide a controlled delay in addition of the formed hydrotalcite-like material to the liquid medium if desired, for example to allow the material to harden.

As the length of the third "slurry" arm of a Y-shaped mixer is reduced a limiting situation is reached where this pipe has zero length, i.e. one tube delivering metal salts, the other delivering alkali and both placed directly in the effluent giving in-situ precipitation.

Thus, for example, in this manner, at least two of the reaction components may be added separately from one another to the liquid medium to be treated.

Whichever form of hydrotalcite-like material (i.e. at least partly undried, immediately formed or formed in-situ) is used to treat the liquid medium the treatment system may be in continuous or batch mode. It may be preferable to adjust the pH of the liquid medium to optimise sorption and, in the case of in-situ precipitation, to optimise hydrotalcite formation, as later explained more fully.

When adding preformed material, best sorption results are achieved for a liquid medium having a pH of from 5–10, which encompasses many industrial effluent media.

When mixing the liquor during in-situ precipitation, certain reactant moieties may come together in the presence of a contaminant ion or particle, so enabling the resultant hydrotalcite immediately to take out contaminant before any structural change occurs in the resultant material which might reduce its sorptive performance. On the other hand, other reactant moieties may come together in the absence of a contaminant ion or particle, so that, effectively, a hydrotalcite particle conventionally developed would precipitate.

This would then immediately (e.g. within 1–2 seconds) react with the contaminant in the water. This is effectively delivering an undried material to the effluent.

The following general methods of preparation of in-situ materials may be used.

1) Addition of chosen metal salts (e.g. zinc+aluminum) to a liquid medium to be treated, followed by addition of acid or alkali to optimise pH.

2) Addition of acid or alkali to a medium followed by addition of metal salt solutions.

3) Simultaneous addition of metal salt solutions and acid or alkali at constant pH, as exemplified later in Example 10.

4) Addition of alkaline sodium aluminate to a medium with the separate addition of magnesium salts, i.e. the methods of preparation used in U.S. Pat. No. 4,019,982 (Fuji).

The respective reaction components are preferably present in amounts which, were they to be admixed, would form a slurry having a solids content of hydrotalcite-like material of from 1 to 20%, typically 5 to 10%, inclusive by weight of the total slurry. The rate of addition is chosen to suit best the sorption requirement.

However, when adopting the in-situ method, it should be noted that different hydrotalcite-like materials are preferentially formed at different respective pH levels. When using the in-situ sorption method, either the pH of the liquid medium can be controlled to provide efficient formation of the hydrotalcite-like material or the reactants can be chosen to provide the most efficient production of hydrotalcite-like material at the pH of the liquid medium to be treated.

For example, if the medium to be treated were at pH7 Zn/Al hydrotalcite could be chosen in preference to Mg/Al because Zn/Al hydrotalcite is more efficiently precipitated at pH7 than is Mg/Al hydrotalcite.

For in-situ formation of a magnesium-aluminium hydrotalcite, the pH of the liquid medium to be treated should preferably be above 9, typically about 10. For certain methods of treatment, for example, removal of reactive dyestuffs from waste water, the pH of the effluent water is already at this level, so no pH adjustment would then be necessary to improve sorption efficiency when using such a hydrotalcite-like material.

When treating contaminated water such as influent water for, or waste water from, an industrial plant, an effective amount of the hydrotalcite-like material may be as little as 0.005 g/l, but it is preferred to employ at least 0.01 g/l, more preferably at least 0.1 g/l. On an industrial scale at least 5 kilo, preferably at least 10 kilo, more preferably at least 20 kilo might be used to treat 50,000 gallons of water. In particular, excellent results in removing humic materials from influent water may be achieved using 8 kilo per 50,000 gallons of water.

The particle size of the hydrotalcite-like material employed for treatment of contaminated water depends particularly on the method of treatment adopted. The material may be milled to provide small product particles having an average particle size of from 0.1 to 500 micron and for most uses this is preferred. Alternatively, the hydrotalcite may be granulated or extruded to form noodles or small chips which may be several mm in size.

Another alternative is to include the hydrotalcite-like material in a composite structure as described in WO-A-92/011932.

The particles may, for example, constitute a separate filter, either in a single filtration step, and/or before or after sand filtration or settlement.

Alternatively or additionally, the hydrotalcite-like material may be pumped into a sand filter, in which case the average particle size would be chosen for compatibility with the filtration characteristics of the filter. Thus, the average particle size might be from 1–1000, typically 5–500 microns.

As yet another alternative, the hydrotalcite-like material may be dosed into a settling tank, in which case the average particle size might be from 50 to 250 microns depending upon the settlement rate best suited to the tank capacity and the concentration of the liquid medium to be treated.

Whichever method is adopted, a filtration aid may be suitably included either as solid material, for example, to aid filtration of filter cakes or as polyelectrolytes to coagulate and/or flocculate hydrotalcite/contaminant particles, especially when in-situ formation of a hydrotalcite-like material is employed.

If, as is usual, it is necessary to separate off sorbate-containing hydrotalcite, this may be accomplished by any of a variety of solid-liquid separation techniques such as centrifugation, settlement (a preferred example of which is an inclined plane separator), use of a hydrocyclone or filtration (eg band, belt, bag, filter press, candle, or, as later described in more detail, cross-flow membrane filtration).

Any hydrotalcite or hydrotalcite-like material may be employed. Such hydrotalcite-like materials are disclosed in GB-A-2075989 and by Shigeo Miyata, in "Physico-chemical Properties of Synthetic Hydrotalcites in Relation to Composition", Clay and Clay Minerals (1980), 28(1), 50–56.

However, whether for forming a solid material for treating the liquid medium, or for conducting the reaction in the presence of the liquid medium, the reaction conditions are preferably chosen so as to provide a hydrotalcite-like material having a grain size, with increasing preference, of ≦130 Å (which appears to be essential if the material is collected after its preparation), ≦120 Å, ≦110 Å, <110 Å, ≦100 Å, especially 40–100 Å inclusive.

Grain sizes are determined in the (001) direction by X-ray diffraction using the Scherrer method as described in E. F. Kaelble, Handbook of X-rays, Mcgraw-Hill (1967). As this method requires as input both the peak width and position, data are collected and analysed as follows:

(i) Data collection

A step scan is used scanning the range 2.0–15.0 degrees two-theta, with a step size of 0.02 degrees and counting for 4 seconds at each step. Data collection is performed using a Siemens D5000 automatic X-ray Diffractometer. 40 kV, 40 mA Copper k-alpha radiation is used in this instance, the beta radiation being removed by a diffracted beam monochromator. Alternatively, data may be collected on similarly equipped commercial wide-angle diffractometers capable of this resolution over the specified angular range, for example a Phillips 17 series diffractometer.

(ii) Data Analysis

Profile fitting is used to determine the Full Width Half-Maximum (FWHM) and position of the requisite peak. Typically a Square-Lorentzian profile is used to model the data, and the peak position and FWHM that are generated are thus fed directly into the Scherrer equation to determine the "Grain Size".

The hydrotalcite-like material may be a material having a composition described by the formula (I) given below:

$$M_{k+m} N_{n+p} (OH)_2 A_z^{y-} \cdot x H_2O \qquad (I)$$

where:

M is any 1+ or 2+ cation or combination thereof,
N is any 3+ or 4+ cation or combination thereof,
k is the sum of the individual mole fractions of the 1+ cations,
m is the sum of the individual mole fractions of the 2+ cations,
n is the sum of the individual mole fractions of the 3+ cations,
p is the sum of the individual mole fractions of the 4+ cations, and
either but not both of k and m can be zero,
either but not both of n and p can be zero
and $k+m+n+p=1$ $A_z^{y-}$ is an anion of charge y− and mole fraction z or combination of anions of similar or differing y− and $k+2m+3n+4p-2-zy=0$ and x can range from 1 to 100.

Examples of the cations M in the above formula are $Li^+$, $Mg^{2+}$, $Zn^{2+}$, $Fe^{2+}$, $Cu^{2+}$, $Sn^{2+}$, $Ca^{2+}$ and $Sr^{2+}$. Suitable N cations include $Al^{3+}$, $Fe^{3+}$, $Ti^{4+}$ and $Sn^{4+}$.

Preferred divalent cations are $Zn^{2+}$, $Cu^{2+}$ or $Mg^{2+}$ or a combination of these ions, or a combination with other divalent cations.

The anion A may be an inorganic or organic anion. Preferred inorganic anions $A_z^{y-}$ are $Cl^-$, $NO_3^-$, $SO_4^{2-}$, $CO_3^{2-}$ and $OH^-$. Examples of organic anions are carboxylate ions such as citrate and stearate.

An especially preferred range of hydrotalcite-like materials has a molar ratio of magnesium:aluminium of from 2:1 to 4:1 and contains $CO_3^-$ anions.

Examples of hydrotalcite-like materials used in the method of this invention are:

$Mg_6 Al_2 (OH)_{16} (CO_3) \cdot xH_2O$
$Zn_{16} Al_2 (OH)_{36} (Cl)_2 \cdot xH_2O$
$Mg_6 Al_2 (OH)_{16} (NO_3)_2 \cdot xH_2O$
$Cu_{16} Al_2 (OH)_{36} (Cl)_2 \cdot xH_2O$ This formula includes hydrotalcite itself, of the formula:

$$Mg_6 Al_2 (OH)_{16} (CO_3) \cdot 4H_2O$$

Preparation of hydrotalcite-like compounds is known and has been described in a number of publications including papers by Walter T Reichle in Solid State Ionics 22 (1986) pages 135–141, entitled "Synthesis of Anionic Clay Minerals (Mixed Metal Hydroxides, Hydrotalcite)" and Chemtech (January 1986) pages 58 to 63, entitled "Anionic Clay Minerals".

The method of preparation should be controlled on the basis that, in general, for the resultant hydrotalcite-like material, it is expected that both i) the sorption kinetics and ii) the sorption capacity will be favourably influenced by 1) lower particle size (increased peripheral surface area)
2) higher pore volume
3) smaller crystallite (i.e. grain) size
4) lower Mg/Al ratio
5) high total surface area.

The relative importance of factors 1–5 will vary in dependence upon the performance characteristics required. Thus, for example, we find that if a high capacity is required, large total surface area is beneficial and product particle size is less important, whereas when fast binding kinetics (eg rate of contaminant uptake) is required, particle size is of prime importance.

We find it especially surprising that for particles of material isolated from a reaction mixture, for example, by filtration, which material has a grain size which is relatively large, but possibly as small as 170 Å, there is little difference between the sorption capacity as between dried and at least partially undried particles (and indeed the sorption capacity of the dried material is sometimes better than that of the undried). However, for particles of even smaller grain size, especially of a grain size ≦130 Å, their respective capacities vary considerably; for a given grain size, the at least partially undried particles may have a considerably higher sorption capacity than that of the dried particles. We find a particularly large difference for particulate material having a grain size of from about 40–100 Å.

Particular methods of preparing hydrotalcite-like materials are as follows:

i) Addition of alkali to a solution of metal salts, described in more detail later in Preparative Example 1. This method is best suited to the preparation of hydrotalcites the metal components of which will precipitate at similar respective pH levels, for example, zinc/aluminium hydrotalcites.

ii) Addition of a solution of mixed metal salts to an alkali solution, described in more detail later in Preparative Example 3. This describes the preparation of a magnesium/aluminum hydrotalcite but this method may be used to prepare other hydrotalcite-like materials.

iii) Simultaneous addition of both the solution of mixed metal salts and the alkali solution under conditions of controlled flow rate to maintain a desired pH in the reaction solution. This method is described in more detail later in Preparative Examples 2 and 4. For a zinc-/aluminum material the pH would be ca 6.5, whilst for a magnesium/aluminum material pH ca. 10.5 would be used. This is our preferred method of preparation as it allows for continuous, as opposed to batch-wise, production, control of product morphology and control of product quality during manufacture.

iv) Mixing of a solution of sodium aluminate and alkali with a metal salt solution, followed by adjustment of pH and maintenance of that pH to "age" the resulting precipitate. This method is disclosed in U.S. Pat. No. 4,019,982.

The above preparation methods i) - iii) allow exercise of a high degree of control over the cationic metal ion pairs required and over their ratio. As compared with these cations much less control is available over the type and nature of the exchangeable anions incorporated in the structure of the various hydrotalcite-like materials. The anion(s) which actually become incorporated into the structure of the hydrotalcite-like material will be determined by the relative concentrations of the various anionic species present in solution when the hydrotalcite-like material is formed and their relative equilibrium constants. For example, it is difficult totally to exclude carbonates from the final structure. Indeed in some cases, we prefer to allow the carbonate to enter the hydrotalcite-like material because of its better filtration characteristics during manufacture.

As a general rule hydrotalcite-like materials bind higher valence anions and large organic anions in preference to lower valence anions and small inorganic anions.

Preparative Examples 1–4, given later, in fact describe the preparation of dried hydrotalcite-like materials, but the skilled reader would appreciate that the drying procedure is to be partly or entirely omitted as appropriate to obtain materials for use in the method of the invention.

Moreover, it is readily apparent as to how they may be modified to allow in-situ preparation.

Thus, the above methods (i)–(iv) may be applied to in-situ preparations of a hydrotalcite-like material in the following manner.

Method (i) can be carried out by modifying the liquid medium to be treated, followed by additions of known amounts of zinc and aluminium salts, followed by slow addition of a strong alkali to form an in-situ precipitate of hydrotalcite-like material.

Method (ii) can be carried out by addition of a strong alkali to the liquid medium to be treated, followed by the slow addition of a mixture of metal salts in solution, whereupon the in-situ precipitate of hydrotalcite-like material is produced.

Method (iii) can be carried out by simultaneous addition of each of a solution or solutions of the metal salts and an alkali solution.

Method (iv) can be carried out by either simultaneous addition of sodium aluminate and the metal salt solution or by the initial addition of the alkaline sodium aluminate solution to the liquid medium to be treated followed by slow addition of the metal, for example, magnesium, salt.

Methods (i) and (ii) are most suited to a batchwise method of operation whereas the simultaneous addition of both reagents for methods (iii) and (iv) would allow continuous operation. However, the lower level of process control required for batchwise operation may lead to lower plant costs as compared with the continuous process.

Nevertheless, the presently preferred process, both for the in-situ and preformed slurry preparation, is method (iii), as described in Method D of Example 4.

We find that by preparing this hydrotalcite in situ in a dyestuff solution, extremely large quantities of dyestuff ($\geq 50\%$ w/w) can be adsorbed by the hydrotalcite.

An especially improved performance, in terms of both rate of colorant binding and colorant binding capacity, can also be obtained by the in-situ formation of small grain size (40–100 Å) hydrotalcite. The process for preparing such materials includes little or no ageing.

BRIEF DESCRIPTION OF THE DRAWINGS

The invention will now be described in more detail with reference to the following Examples, which refer to the accompanying drawings in which.

PREPARATIVE EXAMPLES

Figure 1:
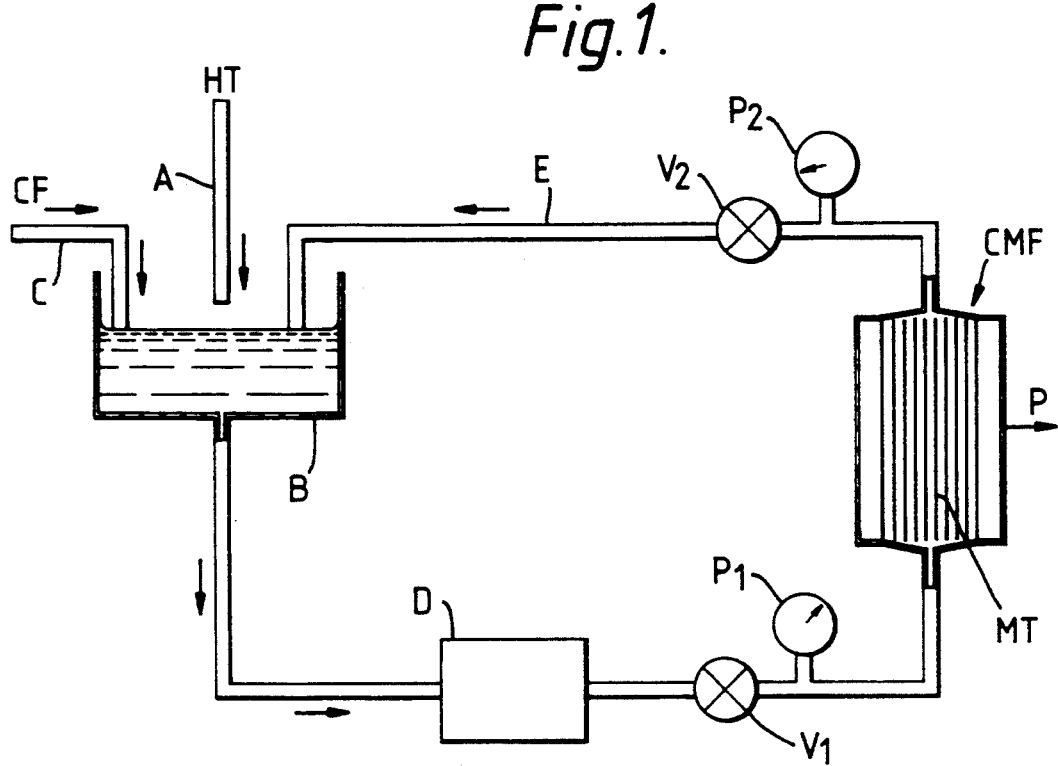
FIG. 1 is a schematic view of a Cross-Flow Membrane Filtration (CFMF) unit for separating solid, particulate hydrotalcite-like material from water, which unit is used in Example 10.

As mentioned above, when carried out in entirety, except where indicated, Preparative Examples 1–4 produce dried hydrotalcite-like materials outside the invention and tested for comparison. For the preparation of undried slurries and in-situ materials, these methods were modified as later described.

I. Preparation of a Zinc/Aluminium Hydrotalcite-Like Material

EXAMPLE 1—Method A

A 1 mol dm$^{-3}$ solution of an 8:1 molar ratio of zinc chloride and aluminium chloride was prepared. To this a 2 mol dm$^{-3}$ solution of sodium hydroxide was added until the original pH of the chloride solution had been increased from around 3 to pH 6.75. This resulted in the formation of a white gel-like precipitate which was separated by centrifuging. The precipitate was then washed by suspension in demineralised water followed by centrifuging. This washing process was repeated several times. The gel was then dried at 80° C. to 100° C. and ground to a fine powder. The material had a grain size well in excess of 130 Å.

EXAMPLE 2—Method B

A 1 mol dm$^{-3}$ solution of an 8:1 molar ratio of zinc chloride and aluminium chloride was prepared and simultaneously pumped via peristaltic pumps into a 5 litre beaker, fitted with a stirrer, along with a 5 mol dm$^{-3}$ solution of sodium hydroxide. The rate of addition of sodium hydroxide was varied to maintain a pH of 6.5 in the reaction mixture. The resulting gel was separated and washed as described above. Particles of the washed precipitate were then slurried in alcohol, filtered and oven dried at 50° C.; the resulting precipitate was then hammer milled to form a fine powder. The material had a grain size well in excess of 130 Å, when measured on the dried powder.

II. Preparation of a Maqnesium/Aluminium Hydrotalcite-Like Material

EXAMPLE 3—Method C

To 98 litres of water 19.5 kg of sodium hydroxide was added. 25 kg of magnesium nitrate and 18.3 kg of aluminium nitrate were dissolved in 73 litres of water to give a Mg:Al ratio of 3:1. The nitrate solution was added to the alkali solution over a period of 30 minutes with stirring. The solution was then heated at 90° C. to 100° C. for 2 hours. The resulting precipitate was filtered and washed. The precipitate was treated as follows:

a) a sample was resuspended in water to give a 10% solids slurry*;
b) a sample was spray dried; and
c) a sample was oven dried at approximately 120° C. and micronised using a fluid energy mill.

*This is an example of a sorbing agent (a), useful in a method embodying the invention in an amount, on a dry weight basis, of ≦0.035% W/V.

In each case, the material had a grain size well in excess of 130 Å when measured on the dried powder.

EXAMPLE 4—Method D 150 litres of an alkali solution comprising a mixture of sodium hydroxide and sodium carbonate, having a total anion concentration of 5M and a hydroxide to carbonate ratio of 3:1 was prepared. A small amount of this solution was added via a peristaltic pump to an agitated vessel containing around 66 litres of demineralised water to raise the pH from neutral to around pH 10.

150 litres of a solution of aluminium sulphate and magnesium sulphate, having a total metal ion concentration of 2M and a magnesium to aluminium ratio of 3:1 was prepared. This sulphate solution was added to the vessel via a peristaltic pump and the vessel contents were agitated. The rate of addition of the sulphate and alkali solutions was adjusted to maintain a pH in the reaction vessel of 10 to 10.5. Immediate precipitation occurred on addition of the sulphate solution. The resulting slurry was cooled to maintain a temperature of 25° C. The reaction time was approximately 50 minutes, plus 10 minutes agitation once addition of the solutions was complete. The slurry was then pressed to form a filter cake and the cake was washed with demineralised water. The wash filtrate was tested for the presence of sulphate anion using barium chloride solution, which indicated that most of the sulphate had been removed from the cake. The cake was then air dried for 1 hour and then passed through a ring drier and then milled in a fluid energy mill to a particle size of 5 to 7 microns. The material had a grain size of about 50Å when measured on the dried powder.

EXAMPLE 5

A hydrotalcite material was prepared exactly in accordance with Example 4, except that the filter cake was reslurried in demineralised water instead of being dried. The cake was reslurried to a solids content of ca.17%. The particle size of this "undried" material in slurry form was ca. 12–15 microns.

EXAMPLE 6

In this in-situ method the hydrotalcite-like material was precipitated into a stirred aqueous solution containing dyestuff by the simultaneous injection of known volumes of aqueous metal salt solution and alkali solution from graduated syringes. The volumes of solution required were calculated from the yield of the preparation described in Example 4 and from the stoichiometry of the reaction taking place.

This method was carried out using essentially the procedure of Example 4, with the addition of both metal salt and alkali solutions to a dye solution. Addition of the alkali solution was started ca. 1 second before addition of the metal salt solution.

The amounts of reaction components used were as follows:

|  | g/l |
| --- | --- |
| Solution (a) | |
| Mg SO$_4$.7H$_2$O | 92.4 |
| Al$_2$(SO$_4$)$_3$.16.H$_2$O | 39.4 |
| Solution (b) | |
| NaOH | 37.5 |
| Na$_2$CO$_3$ | 33.1 |

5ml of each of solutions (a) and (b) were introduced into 200 ml of an aqueous solution of dyestuff.

USE EXAMPLES

Dye sorption was measured by comparing absorbance values for the following:

(a) water containing a non-ionic surfactant and salt, the absorbance of which is taken to be zero,
(b) a given concentration of dyestuff in the water containing the non-ionic surfactant and salt; and
(c) the reduced absorbance resulting from addition of the hydrotalcite-like material to the dye solution.

Tests were conducted using aqueous solutions of dyestuff at a concentration of 0.01 g/l using volumes of from 200 ml to 2 litres for laboratory tests. For 2 litres of solution the dye content was 0.02 g, into which 0.06 g (solids weight) hydrotalcite-like material was placed.

The following procedure was adopted.

A solution in demineralised water of 1 g/l nonionic surfactant (Synperonic A7 ex ICI), 0.01 mol dm$^{-3}$ sodium chloride (ex BDH) and 0.01 g/l dyestuff was prepared. 200 ml of this solution was placed on a stirrer and maintained at a temperature of 25° C. The solution was stirred at all times. A 5 ml sample was withdrawn and filtered through a 0.45 μm Millipore filter.

i) For powdered hydrotalcite samples, 0.014 g of material was added to the remaining solution. At set time intervals (20 mins, 30 mins and 40 mins), further 5 ml samples were withdrawn and filtered through 0.45 μm Millipore filters. The absorbance of each sample was determined against a water/nonionic/NaCl standard on a UV/visible spectrophotometer at the wavelength of maximum absorption of the dyestuff used. As the concentration of colorant at the start of the experiment was 0.01 g/l, the maximum colourant binding capacity was given by:

$$\frac{\text{(Mass colorant removed)}}{\text{(Mass Hydrotalcite added)}} \times 100 = \frac{0.002}{0.014} \times 100 = 14.3\%$$

ii) As described in Example 6, for the in-situ materials various amounts of hydrotalcite were precipitated into the stirred solutions by the simultaneous injection of known volumes of metal salt solution and alkali solution from graduated syringes. After a fixed time interval of 10 mins a 5 ml sample was withdrawn and filtered through a 0.45 μm Millipore filter. The absorbance of each solution was determined against the above non-ionic/water/NaCl standard on a UV/visible spectrophotometer at the wavelength of maximum absorption for the colorant used. The amount of colorant absorbed onto the hydrotalcite was then calculated as for (i) above.

EXAMPLE 7

Procion Turquoise HA ex ICI
Max Absorption 670 nm

| Preparation Method (Particle Size) | Time Elapsed (mins) | Absorbance 670 nm | % Colorant Remaining | Colorant Binding Capacity % W/W |
|---|---|---|---|---|
| Dried Powder samples (0.014 g) | | | | |
| Example 4 - | 0 | 0.322 | 100 | 0 |
| Method D | 20 | 0.185 | 57 | 6.14 |
| (53–75 μm) | 30 | 0.149 | 46 | 7.71 |
| | 40 | 0.131 | 41 | 8.43 |
| Example 4 - | 0 | 0.322 | 100 | 0 |
| Method D | 20 | 0.157 | 49 | 7.29 |
| (APS* = 8 μm) | 30 | 0.136 | 42 | 8.29 |
| | 40 | 0.126 | 39 | 8.71 |
| Undried Materials (0.014 g solids hydrotalcite) | | | | |
| Example 5 - | 0 | 0.538 | 100 | 0 |
| Method D | 20 | 0.073 | 13.6 | 12.34 |
| Slurry | 30 | 0.056 | 10.4 | 12.80 |
| APS 12–15 μm | 40 | 0.046 | 8.6 | 12.87 |

| In-Situ Samples Preparation Method | Mass Hydrotalcite precipitated(g) | | | |
|---|---|---|---|---|
| Example 6 - | 0 | 0.363 | 100 | 0 |
| Method D | 0.006 | 0.270 | 74 | 8.66 |
| | 0.008 | 0.259 | 71 | 7.25 |
| | 0.010 | 0.047 | 13 | 17.40 |
| | 0.014 | 0.028 | 7 | 1.29 |

*APS - Average Particle Size

The results show that 0.014 g of powdered hydrotalcite absorb ca 8–9% W/W of colorant in the 40 min period of the experiment. With the samples prepared in-situ 0.014 g of hydrotalcite absorbs >13% W/W of colorant in only 10 mins. The in-situ material therefore has a greater absorption capacity for colorant and a greater rate of colorant uptake.

The colorant binding capacity for the undried material lies between the low values of ca 8–9% for the dried powder and the highest value of ca 17% for the in-situ material.

EXAMPLE 8

Solar Brilliant Red BA ex Sandoz Max Absorption 525 nm

| Preparation Method (Particle Size) | Time Elapsed (mins) | Absorbance 525 nm | % Colorant Remaining | Colorant Binding Capacity % W/W |
|---|---|---|---|---|
| Dried Powder Samples (0.014 g) | | | | |
| Example 4 - | 0 | 0.240 | 100 | 0 |
| Method D | 20 | 0.160 | 67 | 4.71 |
| (53–75 μm) | 30 | 0.149 | 62 | 5.43 |
| | 40 | 0.134 | 56 | 6.30 |
| Example 4 - | 0 | 0.240 | 100 | 0 |
| Method D | 20 | 0.170 | 71 | 4.14 |
| (APS = 8 μm) | 30 | 0.159 | 66 | 4.86 |
| | 40 | 0.140 | 58 | 6.00 |

| Preparation Method (Particle Size) | Time Elapsed (mins) | Absorbance 525 nm | % Colorant Remaining | Colorant Binding Capacity % W/W |
|---|---|---|---|---|
| Undried Materials (0.014 g solids hydrotalcite) | | | | |
| Example 5 - | 0 | 0.266 | 100 | 0 |
| Method D | 20 | 0.019 | 7.1 | 13.27 |
| Slurry | 30 | 0.012 | 4.5 | 13.64 |
| (APS 12–15 μm) | 40 | 0.008 | 3 | 13.86 |

| In-Situ Samples Preparation Method | Mass Hydrotalcite Precipitated(g) | | | |
|---|---|---|---|---|
| Example 6 - | 0 | 0.265 | 100 | 0 |
| Method D | 0.002 | 0.228 | 86 | 1.4 |
| | 0.006 | 0.000 | 0 | >33.3 |

The results show that for the powdered materials preparation Method D yields material with a colorant binding capacity of ca 6% W/W. Precipitating this material in-situ shows complete colorant absorption with a 0.006 g of hydrotalcite (compared to the use of 0.014 g for the dried powder experiments) giving a binding capacity of at least 33% W/W.

The sorption capacity for the undried material lies between the 6–7% capacities for the dried powder and the best results for in-situ formation (>33%).

EXAMPLE 9

Removal of Humic Substances

A sample of water was obtained from the Laneshaw Reservoir of North West Water. Water from this source contains significant levels of colour from humic substances.

The coloration caused by these humic substances is divided into two classes; true colour and apparent colour. Apparent colour is colloidal in nature and can be removed by filtration. The use of a fine pore size filter paper (eg Millipore 0.45 μm) will remove all apparent colour in a sample of water. The coloration remaining in the water after filtration through a 0.45 μm paper is termed true colour. Levels of true colour are measured by relating the absorbance at 400 nm to a standard scale of haze units. True colour can only be removed by the use of coagulants and flocculants such as aluminium sulphate, silicates, polyelectrolytes, etc.

For this work we have simply compared the absorbance at 400 nm for untreated water to the absorbance for hydrotalcite treated water and related these values to a percentage of true colour.

i) Powdered hydrotalcite materials were added to 500 ml samples of Laneshaw water at concentrations in the range of 10 to 100 ppm (W/W). After stirring for 10 minutes, the water was filtered through a Whatman GF/C filter paper to remove the hydrotalcite. A sample of the filtrate was then further filtered through a Millipore 0.45 μm filter and this second filtrate analysed for absorbance at 400nm. The results were then compared with those for samples of untreated water after filtration using 0.45 μm filters.

ii) Using the calculations made in Example 6 for removal of colourants, hydrotalcite was precipitated in-situ into the Laneshaw water at concentrations in the range 10–100 ppm (W/W). After stirring for 10 minutes the water samples were filtered and analysed as above.

Removal of True Colour
Dried Powder Samples

| Preparation Method (Particle Size) | Amount Added (ppm) | Absorbance 400 nm | % True Colour remaining |
|---|---|---|---|
| Example 4 - | 0 | 0.091 | 100 |
| Method D | 10 | 0.088 | 97 |
| (53–75 μm) | 20 | 0.084 | 92 |
|  | 50 | 0.080 | 88 |
|  | 100 | 0.075 | 82 |
| Example 4 - | 0 | 0.091 | 100 |
| Method D | 10 | 0.086 | 95 |
| (APS = 8 μm) | 20 | 0.085 | 93 |
|  | 50 | 0.082 | 90 |
|  | 100 | 0.079 | 87 |

The results show little removal of true colour by these dried powdered materials.

Undried Materials

| Preparation Method (Particle Size) | Amount Added (ppm) | Absorbance 400 nm | % True Colour remaining |
|---|---|---|---|
| Example 5 - | 0 | 0.093 | 100 |
| Method D | 10 | 0.087 | 93.5 |
| Slurry | 20 | 0.079 | 84.9 |
| (APS 12–15 μm) | 50 | 0.064 | 68.8 |
|  | 100 | 0.043 | 46.2 |

These results show that a substantial proportion of true colour is removed; contrast the above results when using a dried powder.

In-Situ Samples

| Preparation Method (Particle Size) | Amount Added (ppm) | Absorbance 400 nm | % True Colour remaining |
|---|---|---|---|
| Example 6 - | 0 | 0.091 | 100 |
| Method D | 10 | 0.093 | 102 |
|  | 20 | 0.094 | 103 |
|  | 50 | 0.016 | 18 |
|  | 100 | 0.008 | 9 |

The results show in-situ formation gives excellent removal of true colour at hydrotalcite concentrations of ca 100 pm. This seems to be a preferred minimum level as 50 ppm can sometimes show no removal at all.

EXAMPLE 10

Operation of In-Situ Process in a Semi-Continuous Mode

The examples of in-situ precipitation outlined above all relate to simple beaker experiments, followed by filtration on Whatman GF/C filter paper in funnels. A system has been developed, which we call the Cross-Flow Membrane Filter (CFMF), which we find is an extremely efficient way to separate the solid, particulate hydrotalcite from water.

FIG. 1 shows a schematic drawing of the CFMF unit. Hydrotalcite HT is introduced, either as a powder or as the powder slurried in water, via tube A into a reaction vessel, B. A contaminated effluent feed CF is introduced to the reaction vessel A via tube C, where it reacts with the hydrotalcite thus removing the contaminants from solution and absorbing them on the surface of the hydrotalcite particles.

The slurry of hydrotalcite and treated effluent flows from the reaction vessel to the pump D. From the pump D the slurry passes through valve $V_1$ and up the centre of a bundle of tubular PTFE semi-permeable membranes MT of a crossflow membrane filter CMF. The pore size of the PTFE membranes is 1 micron. The membranes are fixed in a vertical direction and the slurry is pumped in an upward direction. From the top of the membranes the slurry is returned to the reaction vessel B via a valve $V_2$ and the tube E. Pressure gauges $P_1$, $P_2$ monitor the pressure across the filter CMF.

Water free from hydrotalcite particles leaves the filter CMF in the direction P.

The returning slurry stream provides sufficient agitation to the reaction vessel to ensure intimate mixing of the hydrotalcite and contaminated effluent. No mechanical mixing was required.

Figure 2:
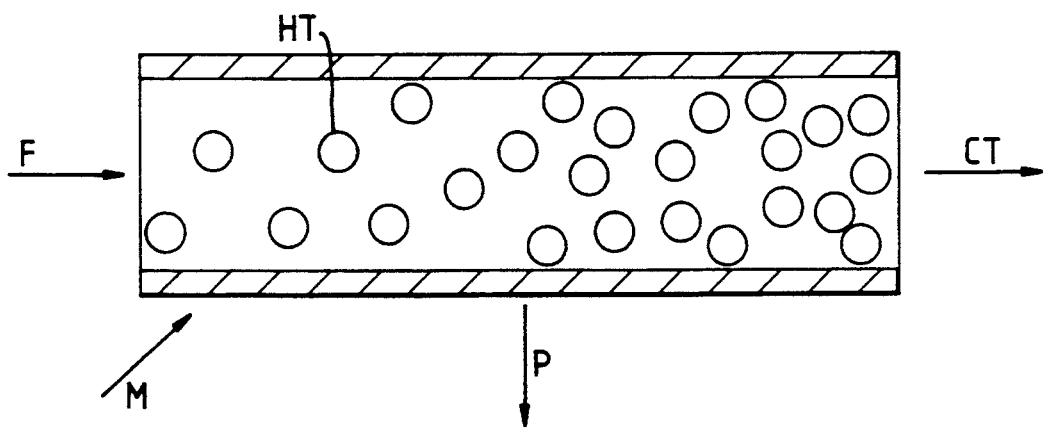
FIG. 2 is a schematic view of part of a tubular membrane of the CFMF unit of FIG. 1 and illustrates how the unit operates.

As can be seen from FIG. 2, passage of a feed F through semi-permeable membrane M produces a concentrated hydrotalcite—containing fluid, while the remaining permeate passes through the membrane in the direction P.

Thus, by controlling the positions of valves $V_1$ and $V_2$ a pressure difference, as measured on the pressure gauges $P_1$ and $P_2$, can be established between the top and bottom of the bundle of tubular membranes. This pressure difference sets up a pressure drop across the membranes such that water is forced through the pores in the membrane. The particles of hydrotalcite are too large to pass through the pores and are thus retained inside the membrane tubes. The water passing through the membranes is known as permeate and can be removed from the filter via a valve and pressure gauge (not shown in diagram) along a tube.

The rate at which permeate is removed from the system is very low compared with the rate at which the pump passes slurry up the membrane tubes. For every 1 litre of slurry exiting the pump >95% is returned to the reaction vessel. Less than 5% is removed as clean permeate. This very high ratio ensures a high velocity of hydrotalcite particles across the membrane surface and so prevents fouling of that membrane.

As clean permeate is drawn off the level of liquid in the reaction vessel drops. If fresh untreated effluent is added via tube C at the same rate as permeate is removed from the system, a constant level of liquid, and therefore a constant residence time, is maintained in the reaction vessel. The system will produce clean permeate until the hydrotalcite becomes exhausted at which point the filter can be stopped, emptied of slurry, refilled with water and fresh hydrotalcite and restarted.

For the in-situ precipitation work the CFMF unit was slightly modified. The single tube A for adding hydrotalcite was replaced by two tubes $A_1$ for addition of the metal solution and $A_2$ for addition of the alkali solution. The concentrations of these two solutions were one sixth of the concentration normally used to prepare hydrotalcite as described in Example 4 (Method D). The flow of solution down each tube was controlled via a calibrated peristaltic pump. The contaminated effluent was also fed to the reaction vessel via a calibrated peristaltic pump with a flow rate of 750 ml/min.

The rate of addition of the metal salts solution was set such that 300 mg of hydrotalcite would be precipitated for every 1000 ml of effluent added, i.e. an "effective" hydrotalcite dose of 300 ppm. The rate of addition of alkali was varied such that the pH of the liquor in the reaction vessel was 10.5-11.0. (An initial charge of a few mls of alkali to the reaction vessel was required to raise the pH from near neutral to pH 10.5). Permeate was withdrawn from the system at such a rate as to keep the volume, and hence the residence time, in the reaction vessel constant.

Three effluents were examined:

Effluent Sample from Cotton Reactive Dyeing

A sample of effluent from dyebaths in which 100% cotton fabric was dyed with reactive dyes was obtained. The COD (Chemical Oxygen Demand) of this effluent was determined using the proprietary HACH system and found to be 750 mgO$_2$/litre.

This effluent was pumped into the CFMF unit as described above with the simultaneous addition of the metal salts and alkali to precipitate hydrotalcite in-situ. Permeate was withdrawn from the system immediately to keep the reaction vessel volume constant. After 10 mins the permeate was sampled and its COD determined as above. The COD was found to be 100 mgO$_2$/litre, i.e. a substantial decrease.

Effluent Sample from Wool Dyeing

A sample of effluent from dyebaths in which wool yarn was dyed with a variety of acid and premetallised dyestuffs was obtained. The COD of this effluent was 350 mgO$_2$/litre. After treatment for 10 mins as for the effluent in (1) above the permeate was sampled. The COD was 25 mgO$_2$/litre.

A "Synthetic" Effluent

A "synthetic" effluent was prepared in the laboratory. This was intended to be a more concentrated version of the cotton reactive dyeing effluent used for (1). The constituents of this effluent (25 litres) were as follows

| | | |
|---|---|---|
| 0.2 g/l Procion Red E-7B | | |
| 0.2 g/l Procion Blue HE-RD | >ex ICI | |
| 0.2 g/l Procion Yellow HE-4R | | |
| 0.46 g/l Sodium Chloride | ex BDH | |
| 0.006 g/l EDTA | ex BDH | |
| 0.01 g/l Dyelube NF | >ex CTC | |
| 0.06 g/l Croscour CS-Super | | |

The COD of this liquor was 7188 mgO$_2$/litre.

The permeate was sampled after 10, 20, 30 and 40 minutes of operation under the conditions described above. The COD values determined were:

| | |
|---|---|
| 10 mins | 100 mgO$_2$/litre |
| 20 mins | 125 mgO$_2$/litre |
| 30 mins | 100 mgO$_2$/litre |
| 40 mins | 175 mgO$_2$/litre |

The above three experiments (1)-(3) show how substantial reductions in the COD of these effluents can be achieved by in-situ precipitation. The last example also demonstrates that the precipitation/filtration cycle can be operated for several tens of minutes without fouling of the membrane. This should allow the process to be operated on a continuous or semi-continuous basis.

The above examples show that, at least for removal of humic materials and colourants, in-situ precipitation has significant benefits even over use of a dried, milled powder.

EXAMPLE 11

Inclined Plane Separator

For applications where it is less important to separate absorbent from aqueous phase rapidly (i.e. effluent rather than in-process applications) but it is more important to remove contaminants down to very low levels, the crossflow membrane filter described above with reference to Example 10 is replaced with an inclined plane separator. Again this allows for intimate contact between absorbent and a contaminant stream without forming an impermeable filter cake.

The concept of the separator allows for pH dosing with acid or alkali to pH 5-10 in the first agitated tank, average time passage through that tank being of the order of 10 mins. The absorbent is then dosed into the second tank which is also agitated. Time passage in that tank is approximately 30 mins, during which time any contamination is absorbed onto the absorbent. In the settlement zone the slurry is forced, by hydrostatic pressure, up a corrugated inclined plane formed from an acrylonitrile-butadiene-styrene copolymer. This allows for rapid solid/liquid separation by minimising the distance required to achieve settlement. The sludge slides down the plane (and may be recycled to ensure full use of the absorbent) and the supernatant liquor flows up the plane and is collected in an overflow via a perforated tube.

Problems of slow settlement of absorbent fines may be resolved by classification of the absorbent during manufacture, use of a coagulant in the settlement zone or the use of a cartridge filter on the supernatant exit line.

A semi-bulk plant is used with the following capacities and time passages:

| | Capacity (m$^3$) | Time Passage (min) |
|---|---|---|
| pH Adjustment | 0.18 | 11 |
| Absorbent Tank | 0.47 | 28 |
| Coagulation Zone | 0.33 | 20 |
| Settlement Zone | 1.40 | 84 |

This plant is designed to produce supernatant, clarified flows of the order of 0.5-1.0 m$^3$/hr.

EXAMPLE 12

Effect of After-Treatment of Hydrotalcite Precipitates

Experiment 1

3 litres of a mixed sodium hydroxide/sodium carbonate alkali solution having a total anion concentration of 5 molar and a hydroxide to carbonate ratio of 3:1, and 3 litres of a metal salt solution having a total metal concentration of 2 molar and a zinc:aluminium molar ratio of 3:1, were prepared. These solutions were reintroduced over a period of 15 minutes into an agitated 1:5 litre water pool, in a vessel fitted with an overflow. The flow rate of the alkali was adjusted to maintain a pH of 6.5–7. Immediate precipitation occurred. The first 2 litres from the overflow were discarded. The resulting slurry was divided into 3 portions. A first portion was left unaged at pH 6.5–7, a second was adjusted to pH11 and a third was adjusted to pH 11.5. The second and third portions were each then aged at 95° C. for 6 hours. The solid was then removed from all three portions by filtration and was then washed. Part was solvent dried and part was tested as a slurry.

Experiment 2

The preparation was the same as that of Experiment 1 except that the solution of metal salts had a zinc:aluminium molar ratio of 8:1. The total concentration was still 2 molar.

Experiment 3

The preparation was the same as that of Experiment 2 except that the solution of metal salts contained magnesium in place of zinc and had a magnesium:aluminium molar ratio of 4:1 and the flow rate of the alkali was adjusted to maintain a pH in the vessel of 10–10.5.

Experiment 4

The preparation was the same as that of Experiment 3 except that the solution of metal salts had a magnesium:aluminium molar ratio of 2.6:1.

The rate of colourant absorption of hydrotalcite samples prepared by the above methods was then measured and compared for wet and dry samples using the following test method.

Kinetics Test 1 litre of a dye solution was prepared containing 1 g/l nonionic surfactant (Synperonic A7), 0.01 mol dm$^{-3}$ sodium chloride and 0.01 g/l dye (Direct Red 80:CI 35780). 200 ml of the solution was placed in a beaker and the solution was stirred. 0.14 g of a slurry containing 10% of dry weight hydrotalcite was added to the dye solution. 5 ml samples were withdrawn at timed intervals and filtered through a 0.45 μm cellulose nitrate filter. The absorbance of each sample at 525 nm was measured using a UV/visible spectrometer.

The results obtained are shown in Table 1.

TABLE 1

| MATERIAL | $M_{II}$:$M_{III}$ (molar) | PREPARATION CONDITIONS | WET OR DRY | GRAIN SIZE (Å) OF DRIED PARTICLES | ABSORBANCE RATIO AT 525 NM at various times (seconds) | | | | |
|---|---|---|---|---|---|---|---|---|---|
| | | | | | 20 | 40 | 60 | 120 | 300 |
| magnesium aluminium | 4:1 | unaged | wet | 50 | 0.68 | 0.63 | 0.55 | 0.44 | 0.30 |
| magnesium aluminium | 4:1 | unaged | dry | 50 | 0.78 | 0.70 | 0.63 | 0.57 | 0.42 |
| magnesium aluminium | 4:1 | aged pH 11 6 hrs | wet | 70 | 0.57 | 0.54 | 0.45 | 0.34 | 0.19 |
| magnesium aluminium | 4:1 | aged pH 11 6 hrs | dry | 70 | 0.77 | 0.71 | 0.66 | 0.55 | 0.40 |
| magnesium aluminium | 4:1 | aged pH 11.5 6 hrs | wet | 70 | 0.62 | 0.53 | 0.46 | 0.34 | 0.19 |
| magnesium aluminium | 4:1 | aged pH 11.5 6 hrs | dry | 70 | 0.75 | 0.68 | 0.64 | 0.51 | 0.50 |
| magnesium aluminium | 2.6:1 | unaged | wet | 80 | 0.45 | 0.39 | 0.33 | 0.23 | 0.1 |
| magnesium aluminium | 2.6:1 | unaged | dry | 80 | 0.72 | 0.71 | 0.65 | 0.61 | 0.52 |
| magnesium aluminium | 2.6:1 | aged pH 11 6 hrs | wet | 120 | 0.25 | 0.16 | 0.13 | 0.14 | 0.02 |
| magnesium aluminium | 2.6:1 | aged pH 11 6 hrs | dry | 120 | 0.76 | 0.71 | 0.64 | 0.56 | 0.51 |
| magnesium aluminium | 2.6:1 | aged pH 11.5 6 hrs | wet | 200 | 0.34 | 0.25 | 0.27 | 0.24 | 0.18 |
| magnesium aluminium | 2.6:1 | aged pH 11.5 6 hrs | dry | 200 | 0.75 | 0.64 | 0.6 | 0.59 | 0.41 |
| zinc aluminium | 3:1 | unaged | wet | <50 | 0.72 | 0.66 | 0.58 | 0.48 | 0.31 |
| zinc aluminium | 3:1 | unaged | dry | <50 | 0.74 | 0.69 | 0.65 | 0.56 | 0.42 |
| zinc aluminium | 3:1 | aged pH 11 6 hrs | wet | 200 | 0.72 | 0.69 | 0.65 | 0.44 | 0.54 |
| zinc aluminium | 3:1 | aged pH 11 6 hrs | dry | 200 | 0.90 | 0.84 | 0.84 | 0.83 | 0.78 |
| zinc aluminium | 3:1 | aged pH 11.5 6 hrs | wet | 125 | 0.73 | 0.71 | 0.65 | 0.63 | 0.57 |
| zinc aluminium | 3:1 | aged pH 11.5 6 hrs | dry | 125 | 0.86 | 0.82 | 0.82 | 0.81 | 0.76 |
| zinc aluminium | 8:1 | unaged | wet | * | 0.30 | 0.54 | 0.48 | 0.34 | 0.18 |
| zinc aluminium | 8:1 | unaged | dry | * | 0.83 | 0.79 | 0.75 | 0.69 | 0.64 |
| zinc aluminium | 8:1 | aged pH 11 6 hrs | wet | * | 0.77 | 0.74 | 0.71 | 0.64 | 0.54 |

TABLE 1-continued

| MATERIAL | $M_{II}$:$M_{III}$ (molar) | PREPARATION CONDITIONS | WET OR DRY | GRAIN SIZE (Å) OF DRIED PARTICLES | ABSORBANCE RATIO AT 525 NM at various times (seconds) | | | | |
|---|---|---|---|---|---|---|---|---|---|
| | | | | | 20 | 40 | 60 | 120 | 300 |
| zinc aluminium | 8:1 | aged pH 11 6 hrs | dry | * | 0.82 | 0.77 | 0.76 | 0.71 | 0.55 |
| zinc aluminium | 8:1 | aged pH 11.5 6 hrs | wet | * | 0.71 | 0.67 | 0.63 | 0.55 | 0.47 |
| zinc aluminium | 8:1 | aged pH 11.5 6 hrs | dry | * | 0.84 | 0.8 | 0.79 | 0.75 | 0.66 |

*Grain size not measured

Capacity Test 200 ml of a solution of 0.1 g Procion Turquoise HA ex ICI in 1 litre of water was added to a flask containing 1 litre of water. 0.06g of the hydrotalcite sample was then added to the flask which was shaken vigorously for 2 minutes and left to stand for 2 hours with shaking every 15 minutes. The solution was then filtered and its absorbance measured and compared to an identical solution with hydrotalcite omitted. The binding capacity was then calculated from the difference between those absorbancies and expressed as a percentage weight for weight. The results are shown in Table 2.

$$\text{Binding capacity} = \frac{100 \times \text{wt of Dye}}{\text{wt of HT}} \times \frac{\text{absorption of STD} - \text{absorption of Sample}}{\text{Absorption of STD}}$$

The above procedure was repeated for the following metal salts combinations.

| 0.12 mol dm$^{-3}$ | ZnSO$_4$.7H$_2$O | ) The pH of the |
| 0.02 " | Al$_2$(SO$_4$)$_3$.16H$_2$O | ) solution was not |
| | | ) adjusted to 10.3 |
| 0.12 mol dm$^{-3}$ | CuSO$_4$.5H$_2$O | |
| 0.02 " | Al$_2$(SO$_4$)$_3$.16H$_2$O | |

TABLE 2

| SAMPLE | $M_{II}$:$M_{III}$ | PREPARATION CONDITIONS | CAPACITY (%) WET SAMPLE | DRY SAMPLE |
|---|---|---|---|---|
| Magnesium aluminium | 4:1 | unaged | 21.1 | 16.1 |
| magnesium aluminium | 2.6:1 | unaged | 23.5 | 9.7 |

| 0.12 mol dm$^{-3}$ | MgSO$_4$.7H$_2$O |
| 0.04 " | Fe(NO$_3$)$_3$.9H$_2$O |
| 0.12 mol dm$^{-3}$ | ZnSO$_4$.7H$_2$O |
| 0.04 " | Fe(NO$_3$)$_3$.9H$_2$O |
| 0.12 mol dm$^{-3}$ | CuSO$_4$.5H$_2$O |
| 0.04 " | Fe(NO$_3$)$_3$.9H$_2$O |

The above results show that, for pairs of wet material and dry material derived therefrom, which materials were of the same particle size, the undried materials in all cases have superior, and in most cases vastly superior, rates of sorption and capacities.

EXAMPLE 13

In-situ and Newly Precipitated Hydrotalcites

Test 1—In-situ using Reactant Solutions

The dye solution was made up as follows:
2 dm$^3$ water
0.12 g Procion Turquoise HA (ex ICI)
pH adjusted to 10.3 by addition of NaOH.

This solution was placed in a 2dm$^3$ stirred beaker, into which 5 cm$^3$ of each of the following solutions were added simultaneously by syringe over ca. 3 secs.

| Metals solution | ( 0.12 mol dm$^{-3}$ MgSO$_4$.7H$_2$O |
| | ( 0.02 mol dm$^{-3}$ Al$_2$(SO$_4$)$_3$.16H$_2$O |
| Alkali solution | ( 0.32 mol dm$^{-3}$ NaOH |
| | ( 0.02 mol dm$^{-3}$ Na$_2$CO$_3$ |

10 cm$^3$ samples were taken at 30, 60, 120 mins, and were filtered through a 0.45 µm Millipore filter. The absorption at 670 nm was measured on a uv/uis spectrophotometer along with dye solution before addition of metals/alkali (STD). The binding capacity was calculated:

Test 2—In-situ using Reactant Solids

The dye solution was made up as above and the same weights of metal salts and caustic/carbonate were added over ca. 3 secs as solids. Samples were taken and binding capacity calculated as above (only carried out using magnesium and aluminium sulphates).

Test 3—Kinetics of Mg/Al In-situ

The kinetics of the in-situ Mg/Al hydrotalcite (HT) were determined by precipitating 0.014 g HT into 200 ml of the dye solution (as described in Example 6). The kinetics were determined by the same method as that described above.

Test 4—Newly Precipitated Hydrotalcite 1900 cm$^3$ water was adjusted to pH 10.3 and placed in a 2 dm$^3$ stirred beaker, Into this 5 cm$^3$ of each of the following solutions were added simultaneously by syringe over ca. 3 secs.

| metals solution | ( 0.12 mol dm$^{-3}$ MgSO$_4$.7H$_2$O |
| | ( 0.02 mol dm$^{-3}$ Al$_2$(SO$_4$)$_3$.16H$_2$O |
| alkali solution | ( 0.32 mol dm$^{-3}$ NaOH |
| | ( 0.02 mol dm$^{-3}$ Na$_2$CO$_3$ |

Immediately after addition of the solutions, 100 cm³ of a solution containing 0.12 g Procion Turquoise HA (ex ICI) was added to the 2 dm³ beaker.

Samples were taken and the binding capacity determined as with in-situ HT. The above procedure was repeated leaving the HT for 5 and 30 mins before addition of the dye.

Test 5—Comparison of Binding Capacities

A direct comparison was made of the sorption performance of each of the following hydrotalcites (HT)

a) dried HT powder (hereinafter called MkII) prepared by drying a part of the same filter cake used to prepare sample (b) below, b) filter cake of reslurried HT (hereinafter called MkIII), c) newly precipitated HT, d) in-situ HT (amounts of reactants controlled to give a desired HT concentration).

In each case, 0.06 g of HT, on a dry weight basis, were added to a 2 litre dyebath. The HT samples on which dyestuff had been sorbed were filtered off and their sorption capacities after 60 minutes were measured as described above. The results are shown in Table 3.

TABLE 3

|  |  |  | 1st Batch of Dye | 2nd Batch of Dye |
|---|---|---|---|---|
| Test 5(a) | MkII |  | 20 | 12 |
|  | MkIII |  | 30 | 28 |
| 1 | In-situ | $Mg^{2+}/Al^{3+}$ | 150 | 90 |
|  |  | $Zn^{2+}/Al^{3+}$ | 150 |  |
|  |  | $Cu^{2+}/Al^{3+}$ | 80 |  |
|  |  | $Mg^{2+}/Fe^{3+}$ | 90 |  |
|  |  | $Zn^{2-}/Fe^{3+}$ |  | 30 |
|  |  | $Cu^{2+}/Fe^{3+}$ | 45 |  |
| 4 | Newly Precipitated ($Mg^{2+}/Al^{3+}$) |  |  |  |
|  | Immediate |  | 130 |  |
|  | 5 mins |  | 90 |  |
|  | 30 mins |  | 90 |  |
|  | 60 mins |  | 80 |  |
|  | 1 day |  | 70 |  |
|  | 1 week |  | 60 |  |
| 2 | In-situ with Solids ($Mg^{2+}/Al^{3+}$) |  | 170 |  |

| Kinetics | Absorbance Ratio 525 nm | | | | |
|---|---|---|---|---|---|
|  | 20 sec | 40 sec | 60 sec | 1 min | 5 min |
| 5a MkII | 0.753 | 0.721 | 0.661 | 0.617 | 0.495 |
| 5b MkIII | 0.423 | 0.372 | 0.309 | 0.264 | 0.140 |
| 3 In-situ* | 0.000 | 0.000 | 0.000 | 0.000 | 0.000 |

Mg./Al.

These results show that 1) there can be very significant differences between the sorption characteristics of different batches of nominally the same dye, probably related to its degree of purity;

2) reslurried filter cake shows both improved kinetics and capacity as compared with its dried powder derivative;

3) the filter cake used to prepare Mks II and III had been prepared some 12 months earlier—the results for newly precipitated hydrotalcite made identically show a very significant capacity improvement which does fall off with time after preparation;

4) the HT made in-situ by addition of respective solutions of reactants is even better than freshly made HT, even if the latter is added immediately after precipitation;

5) the HT made in situ by addition of solid reactants is even better than that made by addition of reactants in solution;

6) it is possible to make several forms of hydrotalcite-like materials having excellent sorption characteristics; and 7) particularly noteworthy is the excellent result for $Zn^{2+}/Al^{3+}$ at neutral pH, because this permits the reagent to have wide applicability.

EXAMPLE 14

Determination of Critical Moisture Content

1Kg of HT filtercake (34% solids) prepared as described in Example 5 was dispersed into 2 litres of ethanol, filtered, redispersed into 2 litres of ethanol and filtered again. The resulting filtercake was weighed into 9 containers, which were left open at room temperature. The containers were weighed and sealed at stages throughout the drying. The solids content of each sample was determined by drying a portion at 110° C. overnight and measuring the difference in weight. A 10% solids aqueous slurry was made up with the samples of partially dried cake (the solids content of each sample being taken into account when making up the slurry to provide the same solids weight in each slurry).

Figure 3:
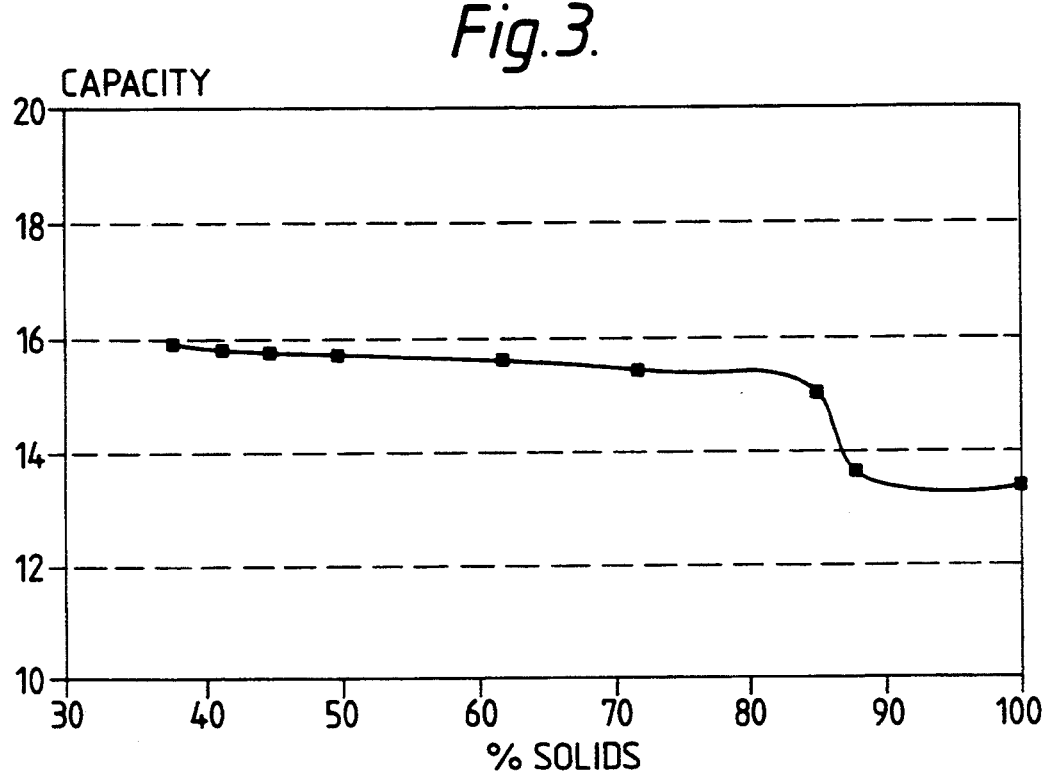
FIG. 3 is a graph showing binding capacity for a dyestuff of particles of hydrotalcite-like material containing different amounts of free water.
Figure 4:
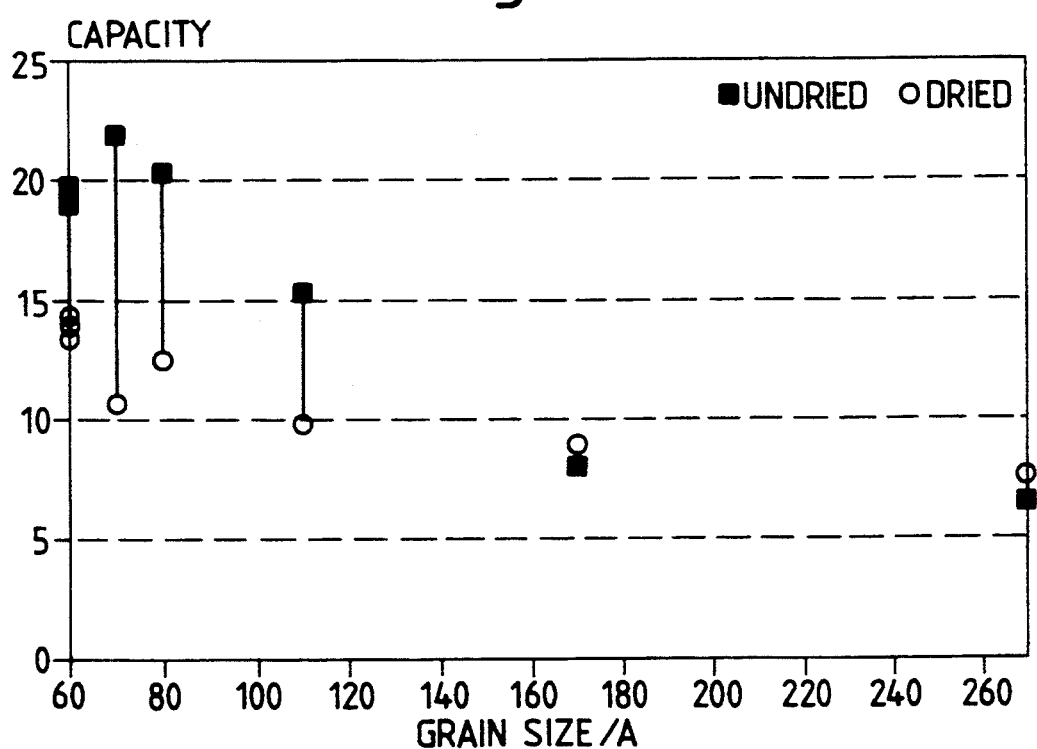
FIG. 4 is a plot of sorption capacity values for un-dried and dried particles of different grain sizes.

The capacities of the slurries for Procion Turquoise HA were determined using the standard capacity test, described in Example 12, and the results are shown in Table 4 and FIG. 3.

TABLE 4

| Sample | Solids | Capacity |
|---|---|---|
| 1 | 37.8 | 15.9 |
| 2 | 41.3 | 15.8 |
| 3 | 44.8 | 15.8 |
| 4 | 49.7 | 15.7 |
| 5 | 61.7 | 15.6 |
| 6 | 71.6 | 15.4 |
| 7 | 85.0 | 15.0 |
| 8 | 87.7 | 13.6 |
| 9 | 100 | 13.3 |

This drying from ethanol was adopted to avoid possible agglomeration/aggregation which can take place when drying from an aqueous medium. This allows the results to be directly comparable with one another (particle size would affect the results of this capacity test).

These results show some reduction in capacity with decreasing free moisture content down to about 14–16%, below which level of free water a very sharp decrease occurs.

EXAMPLE 15

Particles of hydrotalcite-like materials were prepared in the manner described in Example 4 (Method D) except that the slurry before pressing was further treated as follows.

The slurry was divided into 3 portions and the pH of respective portions was adjusted to 10.5, 11.5 and 12.5 by the addition of NaOH.

Each of these three portions was divided into 3 samples. One was left at 25° C. for 2 hours, one was aged at 95° C. for 3 hours and one was aged, in an autoclave, at 150° C. for 2 hours (though the sample aged at pH 10.5 and 150° C. was not processed further or tested).

The particles from each of the 8 samples thus obtained were removed by filtration and then washed. Part was spray dried and part was left as un undried slurry.

The grain size of the material of each sample was then measured by XRD as earlier described and the dye binding capacity was measured as described previously in Example 12.

TABLE 5

| Ageing Temp °C. | Ageing pH | Grain Size Å | Dried (D) or Undried (U) | Capacity |
|---|---|---|---|---|
| 25 | 10.5 | 60 | D | 14.3 |
|  |  |  | U | 19.7 |
| 90 | 10.5 | 60 | D | 13.9 |
|  |  |  | U | 19.4 |
| 25 | 11.5 | 60 | D | 13.3 |
|  |  |  | U | 18.9 |
| 25 | 12.5 | 70 | D | 10.6 |
|  |  |  | U | 21.8 |
| 90 | 11.5 | 80 | D | 12.4 |
|  |  |  | U | 20.2 |
| 90 | 12.5 | 110 | D | 9.8 |
|  |  |  | U | 15.2 |
| 150 | 11.5 | 170 | D | 8.8 |
|  |  |  | U | 7.8 |
| 150 | 12.5 | 270 | D | 7.5 |
|  |  |  | U | 6.4 |

These results show that for materials of larger grain size of 170 Å and larger, there is little difference in the binding capacity of a dried, as compared with an undried, hydrotalcite-like material (indeed a slightly higher binding capacity is observed for the dried as compared with the undried material). However, in contrast to this, for materials of smaller grain size of 110 Å and smaller, the undried material has a significantly greater binding capacity than the dried material.

What is claimed is:

1. A method of treating a liquid medium to remove from it matter present therein, which method comprises adding to the liquid medium at least one of an at least partially undried sorbing agent (a), a freshly prepared sorbing agent (b) and an in-situ sorbing agent (c), which sorbing agent (a) comprises a hydrotalcite-like material resulting from the preparation thereof in a liquid reaction medium, which preparation allows retention, in the hydrotalcite-like material, of at least 10% of free liquid, based on the weight of the hydrotalcite-like material, including the free liquid, and is selected from (a)$_1$ a sorbing agent (a) which is present in an amount, on a dry weight basis, of the sorbing agent, by volume of the liquid medium to be treated, of $\leq 0.035\%$ w/v, and (a)$_2$ a sorbing agent (a) prepared in a manner such that the hydrotalcite-like material has a grain size of $\leq 130$ Å, as measured in the <001> direction by x-ray diffraction on a subsequently dried material;

which sorbing agent (b) comprises a hydrotalcite-like material resulting from the preparation thereof in a liquid reaction medium and present in the reaction medium without substantial removal of the reaction medium; and which sorbing agent (c) comprises a reaction mixture which forms, in-situ, in the contaminated liquid medium, a hydrotalcite-like material.

2. A method according to claim 1 wherein the sorbing agent (a) contains at least about 15% free liquid.

3. A method according to claim 1, wherein the free liquid is an aqueous medium.

4. A method according to claim 1, wherein the sorbing agent (a) is present in an amount, on a dry weight basis, of $\leq 0.015\%$ w/v.

5. A method according to claim 1, wherein the treated liquid medium is an aqueous medium.

6. A method according to claim 1, wherein the sorbing agent comprises a slurry of the hydrotalcite-like material in an aqueous medium.

7. A method according to claim 1, which includes the step of adding to a liquid medium selected from the liquid reaction medium and the liquid medium to be treated respective reaction components which forms, in-situ, in the liquid medium, a hydrotalcite-like material, which reaction products are each present in solution in a solvent.

8. A method according to claim 7, wherein the solvent is water.

9. A method according to claim 7, wherein the solutions of the reaction components are admixed prior to addition thereof to the liquid medium to be treated.

10. A method according to claim 9, wherein the admixture is carried out by directing the solutions of respective reaction components (i) through respective conduits which unite with one another to form a single conduit and then (ii) through the single conduit to the liquid medium to be treated.

11. A method according to claim 8, wherein aqueous solutions of at least two reaction components are added separately from one another to the liquid reaction medium or liquid medium to be treated.

12. A method according to claim 8, wherein the concentration of each reaction component in the solution thereof is such that, were they to be admixed, they would form a slurry having a solid content of hydrotalcite-like material of from 1 to 20% inclusive by weight of the total slurry.

13. A method according to claim 1, which includes the step of adding to the liquid reaction medium or liquid medium to be treated reaction components which forms, in-situ, in the liquid medium, a hydrotalcite-like material, at least one of which reaction components is in solid form.

14. A method according to claim 1, wherein the hydrotalcite-like material of any of the at least partially undried sorbing agent (a), the freshly prepared sorbing agent (b) and the hydrotalcite-like material formed in-situ by the reaction mixture of sorbing agent (c), has a grain size $\leq 10$ Å as measured in the <001> direction by x-ray diffraction on a subsequently dried material.

15. A method according to claim 14, wherein the grain size is 40–100 Å inclusive.

16. A method according to claim 1, wherein the hydrotalcite-like material has the formula (I):

$$M_{k+m} N_{n+p} (OH)_2 A_2{}^{y-} \cdot x.H_2O \qquad (I)$$

where:

M is any 1+ or 2+ cation or combination thereof,

N is any 3+ or 4+ cation or combination thereof, k is the sum of the individual mole fractions of the 1+ cations, m is the sum of the individual mole fractions of the 2+ cations, n is the sum of the individual mole fractions of the 3+ cations, p is the sum of the individual mole fractions of the 4+ cations and either but not both of k and m can be zero, either but not both of n and p can be zero and k+m+n+p=1, $A_z{}^{y-}$ is any anion of charge $y-$ and mole fraction $z$, or combination of anions of similar or different $y-$ and $k+2m+3n+4p-2-zy=0$ and $x$ is from 1 to 100 inclusive.

17. A method according to claim 16, wherein the hydrotalcite-like material contains magnesium and aluminium and the pH of the liquid medium is at least 9.

18. A method according to claim 17, wherein the molar ratio of magnesium:aluminium is from 2:1 to 4:1 and the hydrotalcite-like material contains $CO_3{}^-$ anions.

19. A method according to claim 18, wherein the hydrotalcite-like material has the formula $Mg_6$ $Al_2$ $(OH)_{16}$ $(CO_3)$ $xH_2O$ wherein $x$ is from 1 to 100 inclusive.

20. A method according to claim 16, wherein the hydrotalcite-like material contains zinc and aluminium and the pH of the liquid medium is from 5–10 inclusive.

21. A method according to claim 1, wherein the sorbing agent is used in an amount such that the content of hydrotalcite-like material, on a dry weight basis, is at least 0.005 g per litre of the treated liquid medium.

22. A method according to claim 1, wherein the sorbing agent (a) comprises a hydrotalcite-like material in the form of milled particles having an average particle size of from 0.1 to 500 microns.

23. A method according to claim 1, wherein the sorbing agent (a) comprises a hydrotalcite-like material in a form selected from granulated, extruded and composited form.

24. A method according to claim 1, wherein the sorbing agent is included in a sand filter or settling tank.

25. A method according to claim 1, which includes separating the treated liquid medium from the sorbing agent by means of a crossflow membrane.

26. A method according to claim 1, which includes separating the treated liquid medium from the sorbing agent by means of an inclined plane separator.

27. A method according to claim 1, which includes passing the liquid through a filter comprising the sorption agent (a).

28. A method according to claim 1, wherein the treated liquid medium is a contaminated liquid medium and the matter removed is unwanted contaminant material.

29. A method according to claim 28, wherein the contaminated liquid medium is waste water.

30. A method according to claim 29, wherein the contaminated water is from a plant selected from textile, paper and food and drink processing plants.

31. A method according to claim 28, wherein the contaminated water contains humic acid as contaminant material.

32. A method according to claim 31, wherein the contaminated water containing humic acid is an influent water source, the method thereby providing control of the quality of the influent water.

* * * * *